United States Patent [19]

Carter

[11] Patent Number: 4,858,877

[45] Date of Patent: Aug. 22, 1989

[54] PLASTIC STANDARD FOR SUPPORTING A LIGHT FIXTURE ADJACENT TO THE GROUND

[76] Inventor: E. Ray Carter, 2515 N. 7th St., Phoenix, Ariz. 85006

[21] Appl. No.: 161,493

[22] Filed: Feb. 29, 1988

[51] Int. Cl.⁴ .............................................. F21V 7/00
[52] U.S. Cl. .................................... 248/545; 174/38; 362/302; 362/431
[58] Field of Search .................. 248/545, 156; 174/38; 362/152, 145, 382, 412, 431

[56] References Cited

U.S. PATENT DOCUMENTS

| | | | |
|---|---|---|---|
| 1,794,467 | 3/1931 | Lucas | 362/152 |
| 3,012,134 | 12/1961 | Worth | 362/412 |
| 3,435,124 | 3/1969 | Channell | 174/38 |
| 3,466,379 | 9/1969 | Lohman | 174/38 |
| 3,652,779 | 3/1972 | Grinols | 174/38 |
| 3,727,357 | 4/1973 | Stillman | 248/156 X |
| 3,868,474 | 2/1975 | Bunten | 174/38 |
| 3,988,870 | 11/1976 | Snavely | 174/38 X |
| 4,519,657 | 5/1985 | Jensen | 174/38 X |
| 4,768,139 | 8/1988 | Poppenheimer | 362/431 X |
| 4,774,648 | 9/1988 | Kakuk | 362/431 X |

*Primary Examiner*—J. Franklin Foss
*Attorney, Agent, or Firm*—H. Gordon Shields

[57] ABSTRACT

Plastic light standard includes a nonconductive plastic pipe with an end for receiving electrical conductors or electrical conduit and a cap secured to the upper portion of the pipe above ground. The cap includes an aperture in which an electrical element is secured and through which electrical conductors extend from the electrical element into the standard for connecting the conductors from underground with the conductors from the electrical element. Stabilizer plates are secured to the pipe in the ground for stabilizing the pipe to prevent the pipe from moving.

18 Claims, 3 Drawing Sheets

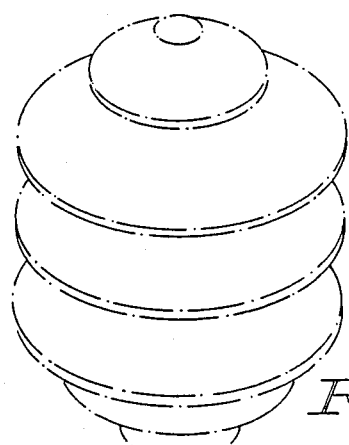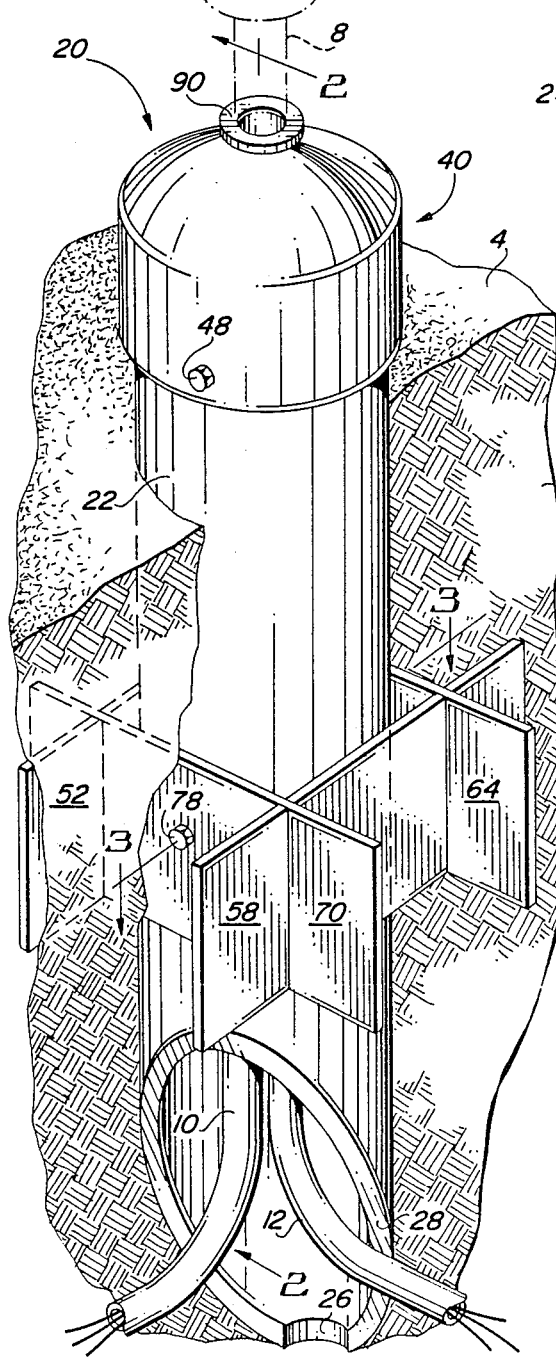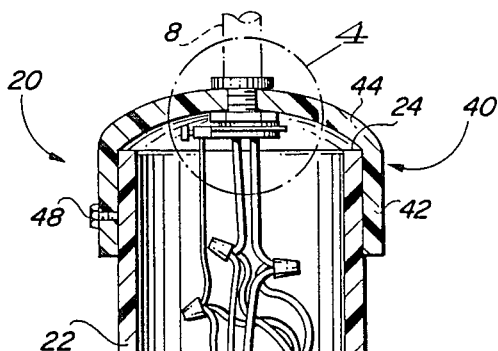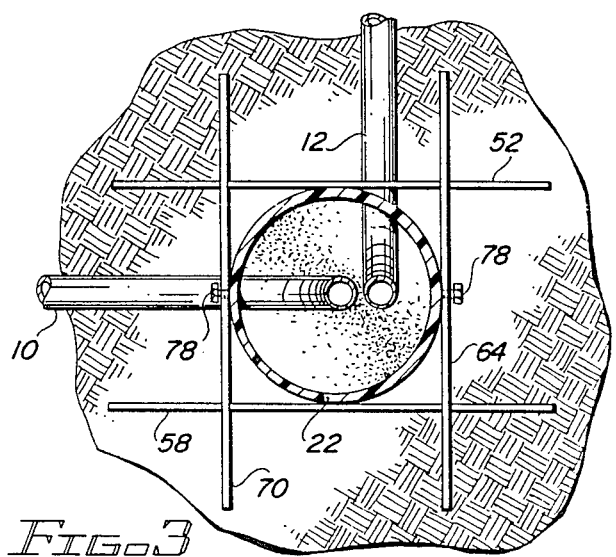

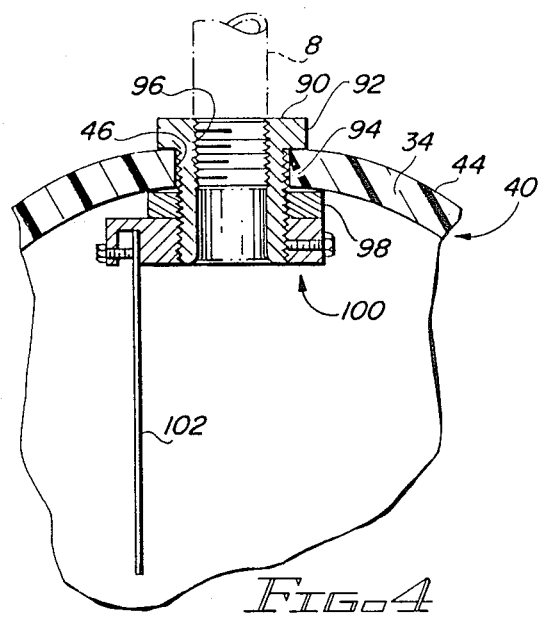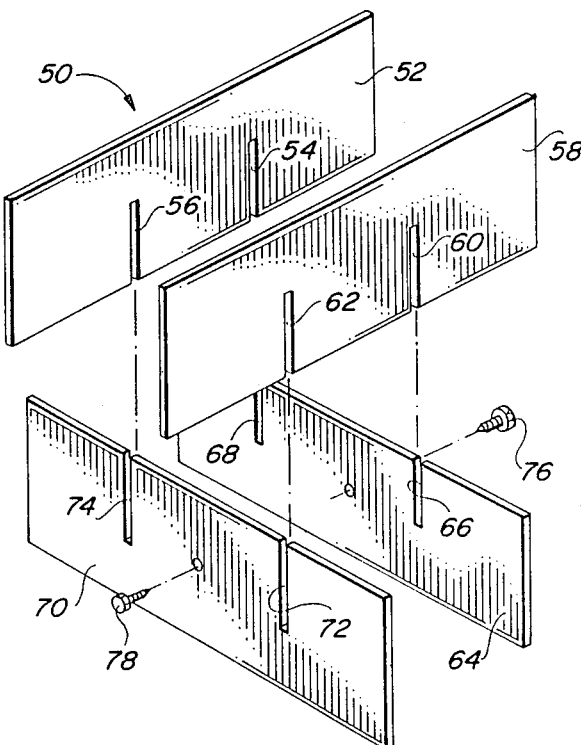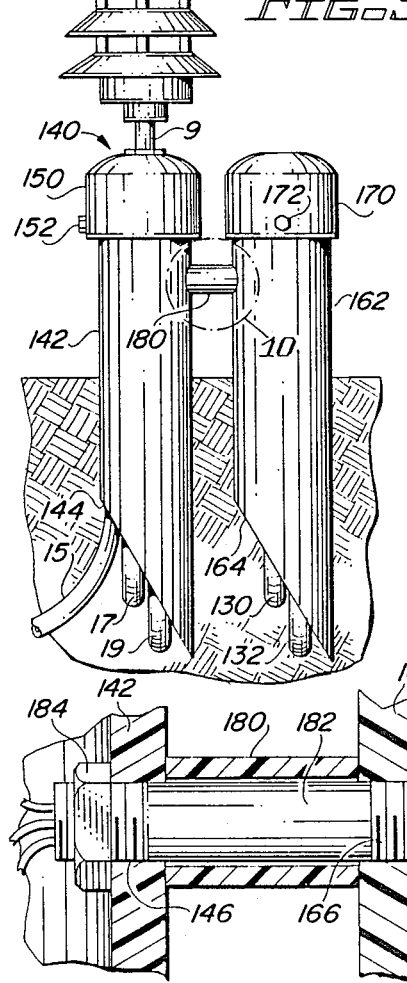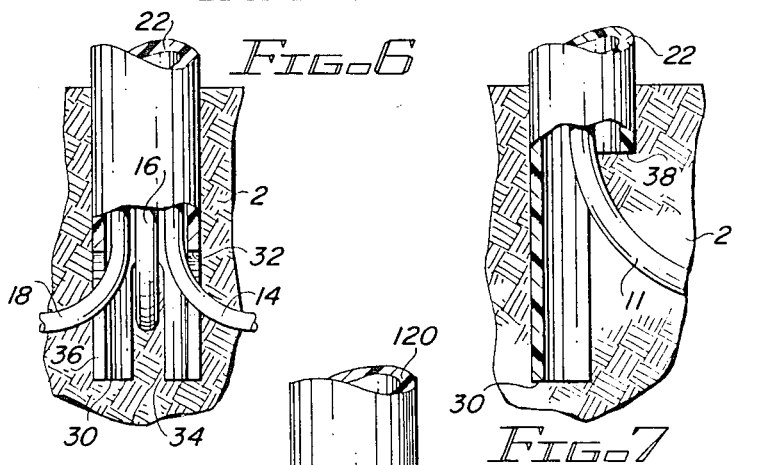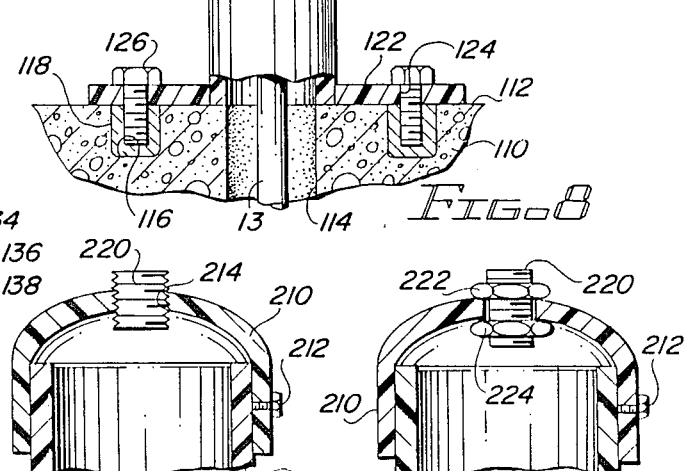

PLASTIC STANDARD FOR SUPPORTING A LIGHT FIXTURE ADJACENT TO THE GROUND

BACKGROUND OF THE INVENTION

1. Field of the Invention

This invention relates to underground pipe and lighting fixtures, and more particularly, to a relatively large plastic pipe insertable into the ground for receiving the end of a plastic or metal pipe and wires extending through the plastic or metal pipe, and comprising a standard to which a light fixture or outlet box may be secured above the ground and in which electrical conductors from the underground pipe and from the light fixture are connected together.

2. Description of the Prior Art

Outdoor lighting adjacent to paths, sidewalks, etc. are typically secured to a metal box on the upper end of steel pipes. The steel pipes in turn extend into the ground and are connected to either plastic pipe or to other steel pipe underground. Conductors extend through the underground pipe and into the vertically extending pipe to connect to the conductors from the light fixture from the electrical outlet. Electrical codes normally require boxes whenever conductors are joined together. This means that an electrical box must be secured to the pipe, and the conductors are then joined in the box. However, a conductor may be joined in a hollow pole without a box.

Since the pipes and the light fixtures are generally disposed in grassy or lawn areas, the inadvertent bumping of the pipes is a relatively frequent occurrence. The bumping, of course, typically is from lawnmowers. The inadvertent bumping by lawnmowers causes the pipe to bend, the boxes to break, and the result is often a broken pipe, broken box, broken electrical fixture, or the like. Also, the steel pipe eventually rusts or corrodes, causing a break in electrical grounding continuity, and becomes essentially useless after a period of time.

Another problem of the prior art devices is corrosion caused by water. This is usually the result of sprinkler systems. The water eventually corrodes the pipes and junction boxes, and renders them more susceptible to breakage by bumping, as by lawnmowers. Or, the weight of the light fixtures can cause breakage as well.

The apparatus of the present invention overcomes the deficiencies of the prior art by substantially eliminating the steel pipe and box. A relatively large diameter plastic pipe, with relatively thick walls, such as a 2½" diameter schedule 40, PVC pipe length is utilized as the light standard. The bottom portion of the pipe is cut at a relatively steep angle in order to allow the standard to mate with pipe located at varying depths underground. If the plastic pipe is relatively shallow, the slanted underground bottom or cut allows the underground pipe to extend into the standard anywhere along the slanted end cut. If the underground pipe is relatively deep, then the slanted end is of no consequence and may not be needed.

Stabilizer plates extend radially outwardly from the standard to prevent the pipe from becoming loose when it is bumped, as by a lawnmower. The stabilizer plates may be located angularly along the pipes at virtually any desired location.

A cap is disposed over the top end of the pipe and is appropriately secured thereto, as by a set screw. The cap includes a metal threaded hub or nipple on which is fastened the light fixture and through which extends the conductors from the light fixture. The conductors are joined within the pipe, thus obviating the need for a junction box.

The hub or nipple is joined to the bond wire which is normally installed with the other conductors in plastic conduit. When the post is used with metal conduit the bond wire from the hub or nipple will be joined to the metal conduit with a bonding bushing or ground clamp.

SUMMARY OF THE INVENTION

The invention described and claimed herein comprises a length of plastic pipe with a cap at one end and a slanted cutoff portion at the opposite end. The cap includes an outside threaded nipple or an inside threaded hub for securing a light fixture to the pipe. The slanted cutoff end of the pipe allows the pipe standard to receive the ends of underground pipe at varying depths in the ground. Stabilizer plates are secured to the pipe standard to prevent the pipe from moving as it is inadvertently bumped.

Among the objects of the present invention are the following:

To provide new and useful non-conductive light standard apparatus for holding a light fixture and for connecting the light fixture to underground electrical conductors;

To provide new and useful plastic pipe having a slanting cutoff portion to receive pipe at varying depths underground;

To provide new and useful plastic pipe for holding a light fixture and in which electrical conductors may be joined;

To provide new and useful light standard apparatus having stabilizer plates disposed underground for preventing the movement of the light standard when it is inadvertently bumped; and To provide new and useful light standard apparatus for supporting a light fixture above ground and for receiving underground electrical conduits.

BRIEF DESCRIPTION OF THE DRAWING

FIG. 1 is a perspective view of the apparatus of the present invention in its use environment.

FIG. 2 is a view in partial section taken generally along line 2—2 of FIG. 1.

FIG. 3 is a view in partial section taken generally along line 3—3 of FIG. 1.

FIG. 4 is an enlarged view in partial section taken generally from circle 4 of FIG. 2.

FIG. 5 is an exploded perspective view of a portion of the apparatus of the present invention.

FIG. 6 is a side view in partial section of an alternate embodiment of a portion of the apparatus of the present invention.

FIG. 7 is a side view in partial section of another alternate embodiment of a portion of the apparatus of the present invention.

FIG. 8 is a side view in partial section of another alternate embodiment of the apparatus of the present invention.

FIG. 9 is a side view illustrating another embodiment of the apparatus of the present invention.

FIG. 10 is an enlarged view in partial section of the apparatus of FIG. 9, taken generally from circle 10 of FIG. 9.

FIG. 11 is a side view in partial section of a portion of the apparatus of the present invention.

FIG. 12 is a side view in partial section of the apparatus of FIG. 11 illustrating sequentially the securing of an element to the apparatus of the present invention.

DESCRIPTION OF THE PREFERRED EMBODIMENT

Figure 13:
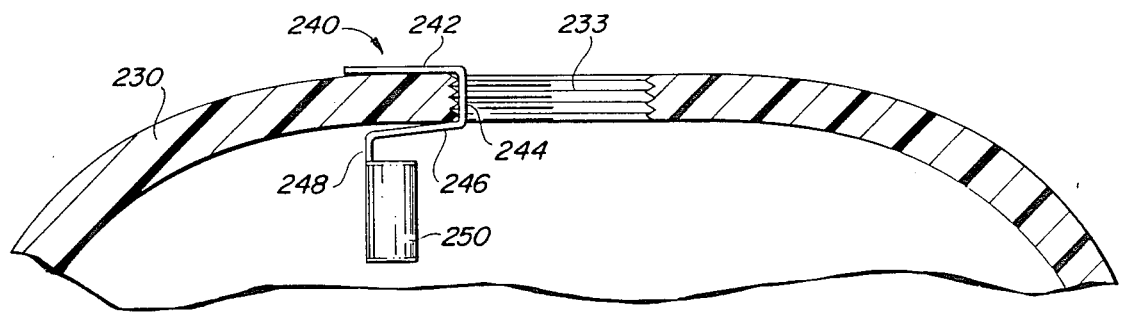
FIG. 13 is an enlarged view in partial section illustrating an alternate element usable with the apparatus of the present invention.

FIG. 1 is a perspective view of standard apparatus 20 of the present invention in its use environment. Included in FIG. 1 is ground 2, with surface 4, and the standard apparatus 20 is shown disposed within the ground 2 and extending above the surface 4. The standard apparatus 20 includes a cylinder 22 and a cap 40. A light fixture 6 is shown in dotted line connected to the cap of the apparatus 20 by a connector rod 8. The purpose of the standard 20 is to support the light fixture 6 and to serve as a housing for connecting electrical wires, as best illustrated in FIG. 2. The wires extend into the apparatus 20 through a pair of conduits 10 and 12. The conduits 10 and 12 may be metal or plastic, as desired. The conduits 10 and 12 are, of course buried in the ground 2 and the conduits terminate within the apparatus 20. A stabilizer 50, comprising a plurality of rectangular plates, is secured to the cylinder 22 beneath the surface 4 of the ground 2.

FIG. 2 is a view in partial section of the apparatus 20, taken generally along line 2—2 of FIG. 1, showing details of the apparatus 20 and of the conduits 10 and 12 and their electrical conductors. FIG. 3 is a view in partial section of the lower portion of the cylinder 22, taken generally along line 3—3 of FIG. 1. FIG. 4 is an enlarged view of a portion of the cap 40 and of elements associated therewith, taken generally from Circle 4 of FIG. 2. FIG. 5 is an exploded perspective view of the stabilizer apparatus 50. For the following discussion, reference will primarily be made to FIGS. 1, 2, 3, 4, and 5.

The cylinder 22 of the standard apparatus 20 is made of nonconductive plastic. The cylinder 22 has a top or upper end 24 and a bottom or lower end 26. The diameter of the cylinder 22 is appropriate for the number of conduits which extend within and which terminate inside the cylinder.

A slant cut 28 extends diagonally upwardly from the lower end 26 of the cylinder. The purpose of the slant cut 28 is to conveniently provide for the conduits to extend into the cylinder 22 from different depths in the ground. This is best shown in FIG. 2. As shown in FIG. 2, the conduits 10 and 12 are disposed substantially perpendicularly to each other and their horizontal portions are at different depths within the ground 2. Both extend through the slant cut 28 and terminate within the cylinder 20.

The top of the cylinder 22 is closed by the cap 40. The cap 40 includes a cylindrical portion 42 and a dome portion 44. An aperture 46 extends through the dome 44. The aperture 46 is smooth, as will be discussed below. However, in another embodiment of the cap 40, there is a threaded aperture which receives directly an externally threaded connector nipple 8. The connector nipple 8 is connected to a reducer bushing or hub 90. The bushing or hub 90 is secured to the cap 40. The busing or hub 90 is best shown in FIG. 4. FIG. 4 is an enlarged view of the cap 40 taken generally from circle 4 of FIG. 2, showing details of the bushing or hub 90 and associated elements. The cap 40 is secured to the cylinder 22 by means of a screw 48.

The stabilizer 50, comprising four plates, is appropriately secured to the cylinder 22 beneath the surface 4 of the ground 2. The stabilizer 50 helps to stabilize the apparatus 20, and particularly the cylinder 22, in the ground. Principal purposes of the stabilizer 50 are to prevent rotation or leaning of the cylinder 22.

The stabilizer 50 comprises four rectangular plates 52, 58, 64, and 70. The four plates are secured together in a rectangular configuration, as best shown in FIGS. 1 and 3. The plate 52 includes a pair of generally parallel slots 54 and 56 which extend upwardly from the bottom of the plate 52. The plate 58 is substantially identical to the plate 54. The plate 58 also includes a pair of slots 60 and 62 which extend upwardly from the bottom of the plate and are substantially parallel to the slots 54 and 56. The distance between the slots 54 and 56 and between the slots 60 and 62 is substantially equal to the outer diameter of the cylinder 22. This is best shown in FIG. 3.

The plates 64 and 70 are substantially identical to the plates 52 and 58 in overall dimension. However, the plates 64 and 70 include parallel slots which extend downwardly from the top surface of the plates. The plate 64 includes a pair of slots 66 and 68, and the plate 70 includes a pair of slots 72 and 74. The distance between the slots 66 and 68, and between the slots 72 and 74, is substantially the same as the distance between the slots 54, 56 and 60, 62.

As best illustrated in FIG. 5, the four plates 52, 58, 64, 70 fit together, with the slots in the plates mating with each other to provide the generally rectangular stabilizer 50. The slots 54 and 68 mate with each other, as do the slots 56 and 74. Similarly, the slots 60 and 66 mate with each other and the slots 62 and 72 mate with each other. The plates interlock with each other as is shown in FIGS. 1, 2, and 3, to provide outwardly extending fins to stabilize the cylinder 22.

The stabilizer 50 is secured to the cylinder 22 by a pair of screws 76 and 78. The screws 76 and 78 are shown extending through the plates 64 and 70 respectively, and into the cylinder 22.

With the four plates locked together through their slot arrangement, which, incidentally, is a well known and understood locking arrangement, the assembled stabilizer 50 is then secured to the cylinder 22 by the screws 76 and 78. The outwardly extending plate portions or fins of the stabilizer 50 essentially prevent the cylinder 22 from rotating or from moving sideways or laterally in the ground 2.

Referring again to FIG. 2, it will be noted that the conduits 10 and 12 extend from the ground through the slant cut 28 and into the interior of the cylinder 22. Within each of the conduits 10 and 12 are three wires, including a hot wire, a neutral wire, and a ground wire. The ground wires are appropriately secured together and to a ground strap or wire 102 (see FIG. 4) and the other pairs of wires are appropriately secured together to the respective or corresponding wires which extend downwardly from the light fixture 6. The light fixture 6 normally does not include a ground wire, but only an active pair, hot and neutral. Thus, there is the necessity of grounding the hub or nipple with a wire or strap. All of the ground wires will be connected together and the other pairs of wires will be appropriately secured together by wire nuts, as is well known and understood in the art.

FIG. 4 illustrates the connection of the connector nipple 8 with the bushing or hub 90. The bushing 90 is in turn secured to the dome 44 of the apparatus 20.

The reducer bushing 90 extends through the aperture 46 in the dome 44 of the cap 40. The bushing 90 is a well known and understood element. It includes a flange 92 which is disposed on the dome 44 about the aperture 46. Beneath the flange 92 is an externally threaded shank portion 94. The interior of the bushing includes interior threads 96. The bushing 90 is secured to the cap 40 by means of a nut 98. The nut 98 is disposed on the inside of the cap 40 and mates with the external threads 94 to secure the bushing to the cap 40.

The connector nipple 8 of the light fixture 6 extends into the internally threaded bore or portion 96 of the bushing or hub 90 to secure the light fixture to the standard 20.

At the bottom end of the bushing 90 is a bond bushing 100. The bond bushing 100 is well known and understood in the art. It is appropriately secured to the externally threaded portion of the bushing 90 within the cap 40 and below the nut 98.

A ground element or pigtail 102 is appropriately secured to the bond bushing as a part thereof. As shown in FIG. 2, the ground wires from the conduits 10 and 12, and the ground wire, if any, from the light fixture 4, are appropriately secured, as by wire nuts, to the pigtail 102.

As discussed above, the purpose of the slant cut 28 at the bottom of the cylinder 22 is to allow electrical conduits disposed at different depths in the ground 2 to conveniently be received into the cylinder 22. Where conduits are at generally at the same depth, or where the conduits extend from opposite directions, different types of cuts may be required at the lower portion of the cylinder 22. Some alternative cuts are illustrated in FIGS. 6 and 7. In FIGS. 6 and 7, the cylinder 22 is shown with a square cut bottom 30.

In FIG. 6, longitudinally extending slots or cuts 32, 34 and 36 are shown extending vertically or axially upwardly from the square cut bottom 30. Three conduits 14, 16, and 18 are shown extending through the cuts 32, 34, and 36, respectively. The conduits 14, 16, and 18 are all at about the same depth in the ground 2.

In FIG. 7, a notched cut 38 is illustrated. The purpose of the noticed cut is to receive a relatively shallow conduit. The overall length of the cylinder 22 within the ground 2 is substantially the same in all embodiments, but the length of the various cuts or notches may vary accordingly to the depth of the conduits which the cylinders receive. Obviously, the cylinder 22 must extend into the ground 2 a distance sufficient to provide stability for the cylinder.

It will be noted that the stabilizer 50 has been omitted from the illustrations of FIGS. 6 and 7.

FIG. 8 is a view in partial section of another alternate embodiment of the apparatus of the present invention, illustrating the use of the apparatus of the present invention in the environment of a concrete pad. A concrete pad 110 is shown, with a top surface 112 and with a hole 114 extending downwardly from the top surface 112. A plastic cylinder 120 is shown disposed on the surface 112 and substantially coaxially disposed about the hole 114. An electrical conduit 13 is shown extending upwardly through the hole 114 and into the cylinder 120. A ring 122 is disposed about the bottom or lower portion of the plastic cylinder 120 and is appropriately secured thereto, as by solvent welding or the like. A plurality of holes or apertures extend through the ring 122. A pair of such holes or apertures 124 is shown. A screw or bolt 126 extends through each hole. The screw or bolts 126 extend into concrete anchors 118 which are in turn disposed within drilled holes 116 in the concrete 110.

The use of the ring 122 secured to the cylinder 120 allows the cylinder 120 to be secured to the concrete 110 with minimal drilling into the concrete itself. The hole 114 through which the conduit 13 extends may be preformed in the concrete since it is designed to receive the electrical conduit 13.

In some cases, it will not be necessary to use the anchors 118 in the holes 116. Rather, bolts or screws 126 may extend directly into the drilled holes 116. However, concrete anchors 118 are typically used. Such anchors, usually made of lead or lead alloy, are well known and understood in the art.

FIG. 9 is a side view of another alternate embodiment of the apparatus of the present invention. Light standard apparatus 140 includes a pair of cylinders 142 and 162 separated by a spacer 180. The cylinders 142 and 162 comprise a pony pair, with the cylinder 162 comprising, as it were, an auxiliary or pony cylinder for receiving conduits in addition to the conduits extending into the cylinder 142 of the light standard apparatus 140. The use of a pony cylinder is advisable or necessary when the number or size of the conduits is too large for a single cylinder or light standard.

FIG. 10 is an enlarged view in partial section of the spacer 180 and the cylinders 142 and 162, taken generally from circle 10 of FIG. 9. For the following discussion, reference will be made to both FIGS. 9 and 10.

In FIG. 9, a light fixture 7 is shown disposed above and secured by a connector nipple 9 to light standard apparatus 140 of the present invention. The light standard apparatus 140 includes a pair of cylinders, the cylinder 142 and the cylinder 162. The cylinder 142 includes a diagonal cut 144 at its bottom, and the cylinder 162 includes a diagonal cut 164 at its bottom. The diagonal or slant cuts 144 and 162 allow conduits at different depths to extend into the respective cylinders. Three conduits 15, 17, and 19 are shown extending through the slant or diagonal cut 144 into the cylinder 142. Two conduits 130 and 132 are shown extending through the slant cut 164 into the interior of the cylinder 162.

A cap 150 is secured to the cylinder 142 by a screw 152. A cap 170 is shown secured by a screw 172 to the cylinder 162.

A connector nipple 9 is appropriately secured to the cap 150. Accordingly, the cap 170 is closed on top and does not include an aperture for receiving a nipple 9.

The cylinders 142 and 162 are connected together. The connection between the two cylinders is rigid or fixed. The spacer 180 extends between the cylinders 142 and 162. Within the spacer 180, and extending into the respective cylinders 142 and 162, is a nipple 182. The nipple 182 extends through an aperture 146 in the cylinder 142 and through an aperture 166 in the cylinder 162.

The nipple 182 is secured to the cylinder 142 by a nut 184, and the nipple 182 is secured to the cylinder 162 by a nut 186. The nuts 184 and 186, disposed on the inside of the respective cylinders 142 and 162, securely lock the cylinders 142 and 162 together to provide a relatively rigid connection. The spacer 180, between the cylinders 142 and 162, limits or defines the distance or space between the two cylinders.

Since the light fixture 7 is secured to the cylinder 142, the cylinder 142 is a primary cylinder and the cylinder 162 is an auxiliary or secondary (pony) cylinder. Wires from the conduits 130 and 132, which extend into the secondary cylinder 162, then extend into the primary cylinder 142 through the nipple 182.

In FIG. 10, a plurality of conductors 134, 136, and 138 are shown extending through the nipple 182 between the cylinders 142 and 162. The spacer 180 is preferably made of plastic, like the cylinders 142 and 162 and their respective caps 150 and 170. The nipple 182 is also preferably plastic, and the nuts 184 and 186, are preferably metal, but they need not be. If a metal nipple is used, it should be grounded. Moreover, it is obvious that the spacer and nipple may be a single element, with a major outer diameter comprising the spacer portion, and a minor outer diameter at opposite ends to extend through the apertures in the respective cylinders and appropriately threaded for receiving nuts for securing the cylinders together.

It is obvious that the pony cylinder light standard apparatus 140 may be pre-made, for convenience, before installation at a site. That is, the double cylinder or pony cylinder arrangement need not be fabricated or assembled at the installation site. Moreover, it is also obvious that the slant or diagonal cuts 144 and 164 of the respective cylinders may be the longitudinally extending slots or cuts, such as shown in FIG. 6, or the notched cut as shown in FIG. 7, or any other appropriate cut.

It is preferred that a pony pair, such as the apparatus 140, not be used in the concrete environment, such as shown in FIG. 8. However, under certain circumstances, a pony arrangement may be required in a concrete environment. In such cases, the rings for the plastic cylinders may be appropriately cut or configured to provide appropriate spacing between the cylinders. A nipple/spacer, which provides a conduit for wires, would still be necessary.

In FIGS. 11 and 12, a light standard cylinder 200, or the upper part thereof, is shown with a cap 210 secured to it. A screw 212 is shown securing the cap 210 to the cylinder 200.

An aperture 214 extends through the center of the cap 210, and a nipple 220 extends through the aperture 214. In FIG. 11, the nipple 220, alone, is shown extending through the aperture 214. In FIG. 12, a pair of nuts 222 and 224 is shown respectively on the outside and on the inside of the cap 210 to secure the nipple 220 in place in the aperture 214.

The aperture 214 may be threaded, if desired, and the nipple 220, which has external threads, may be threadedly engaged with the aperture 214. With or without a threaded engagement, the nuts 222 and 224 are preferably used to secure the nipple 220 in place. A connector nipple for securing a light fixture, like the connector nipples 8 or 9, is then used with the nipple 220. However, it is well know and understood in the art that a coupling is used to connect two nipples. Moreover, a bond bushing, or other method of connecting a ground wire to the nipple, will be used so that the nipple can be grounded, thereby grounding any light fixture or outlet box attached to the nipple.

FIG. 13 is an enlarged view in partial section of a portion of a cap 230. The cap 230 includes a threaded aperture 233 extending through the top of the cap. An externally threaded connector nipple, such as the connector nipples 8 or 9, discussed above, may extend directly into the threaded aperture 233. For the appropriate grounding of a light fixture through its connector nipple, a ground lug 240 may be used. The ground lug 240 is preferably made of brass, or some other relatively soft electrically conductive material. Brass is typically used, as is well known and understood in the art. The ground lug 240 is shown in both FIGS. 13 and 14.

Figure 14:
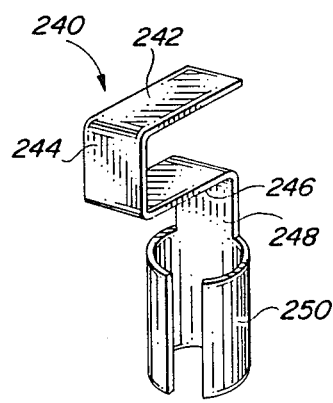
FIG. 14 is a perspective view of an element of the apparatus of FIG. 13.

FIG. 14 is a perspective view of the ground lug 240. The ground lug 240 of FIGS. 13 and 14 is a generally U-shaped configuration disposed with the parallel arms of the U horizontally on the top and on the bottom of the cap 230, and with the connecting portion of the U disposed in the threaded aperture 233. The "U-shaped"-portion of the ground lug 242 includes a top arm 242, a bottom arm 246, and a connecting portion 244. The arm 242 is generally parallel to the arm 246, with the arm 242 being disposed on the top of the cap 230, the connecting portion 244 extending on the threaded portion 233 of the cap, and the arm 246 disposed on the inside of the cap 230. While the arms 242 and 246 are generally parallel to each other, they may be appropriately bent generally towards each other to help provide a grip on the cap 230 to facilitate the lug 240 remaining in place while the connecting nipple threadedly engages the aperture 233.

Extending downwardly from the other end of the arm 246 is a connecting strap 248. The connecting strap 248 extends between the arm 246 and a socket portion 250. The socket 250 receives a ground wire (not shown), and the socket 250 may be appropriately squeezed to insure a clamping hold onto the ground wire.

Figure 15:
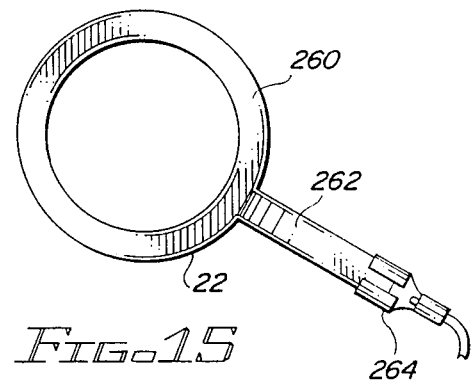
FIG. 15 is a top view of an alternative element usable in the apparatus of the present invention.
Figure 16:
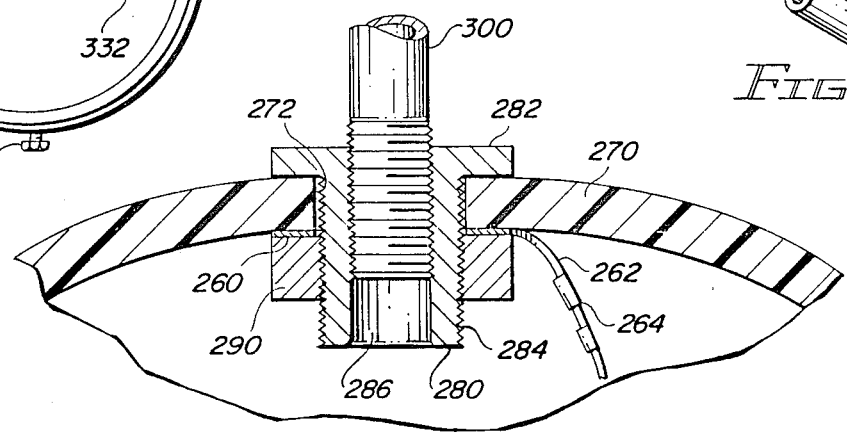
FIG. 16 is an enlarged view in partial section illustrating the alternate element shown in FIG. 15 in its use environment.

FIG. 15 is a top view of a grounding ring 260 with an integral spade tap or arm 262 for connecting a wire to the grounding ring. The grounding ring 260 comprises a grounding element which may be used in conjunction with a nipple or bushing, as shown in FIG. 16. The ring 260 is preferably simply a circular conductive metal element having a radially outwardly extending tap or terminal arm 262. The ring 260 is circular in configuration, with an inner diameter slightly greater than the exterior diameter of the bushing or nipple with which it is used.

FIG. 16 is a side view in partial section of a portion of a cap 270 having an aperture 272 extending through the cap. A reducer bushing or hub 280 is shown extending through the aperture 272. The bushing or hub 280 includes a top flange 282. The flange 282 is disposed on the top of the cap 270 and it extends outwardly from the aperture 272. The bushing or hub 280 includes external threads 284. The bushing or hub 280 includes an internal bore 286 that is partially threaded and partially smooth. A nut 290 is used to secure the bushing or hub 280 and the ring 240 to the cap 270. Between the nut 290 and the cap 270 is the grounding ring 260. The nut 290 insures the electrical contact between the ring 260 and the bushing or hub 280.

The tab or terminal arm 262 extends outwardly beyond the nut 290 and is bent downwardly for convenience in being secured to a ground wire. The grounding ring 260 is electrically connected to the bushing or hub 280 by the nut 290, and thus to a metal connector nipple 300 for a light fixture or box (not shown) which extends into the internally threaded portion of the bore 286 of the bushing 280. At the outer end of the arm 262 is a connector terminal 264. A ground wire or pig tail is connected to the terminal 264. The nipple 300 will be electrically connected to the ground wire through the bushing 280, the ring 260, the arm 262, and the terminal 264.

The use of the grounding ring 260 eliminates the need for a bond bushing, such as the bond bushing 100 shown in FIGS. 2 and 4, and also the need for the ground lug 240 shown in FIGS. 13 and 14.

Figure 17A:
FIGS. 17A and 17B are perspective views of alternate embodiments of the apparatus of FIG. 15.
Figure 17B:
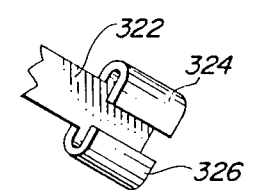

FIGS. 17A and 17B show alternate elements for connecting a ground wire to a tap or arm of the grounding ring, such as the grounding ring 260. In FIG. 17A, a tab 312 is shown with a screw 314 extending therethrough. A ground wire may be secured to the tab 312 by the screw 314.

In FIG. 17B, a tab 322 is shown with a pair of crimp flanges 324 and 326. A ground wire is simply inserted within the flanges 324 and 326, and the flanges are then crimped to hold the wire in electrical contact. The crimp flanges 324 and 326 comprise a socket and are integral with the tap 322, thus providing good electrical connection with a ground wire.

Figure 18:
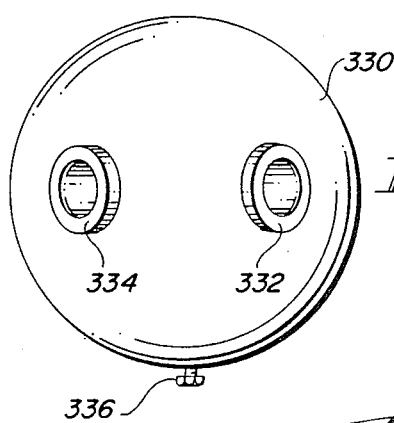
FIG. 18 is a top view of an alternate embodiment of a portion of the apparatus of the present invention.

FIG. 18 illustrates a cap 330 with a pair of bushings or hubs 332 and 334. Thus, instead of supporting a single electric element, as is shown by the caps in the various drawing Figures, the cap 330 may support a pair of electrical elements, such as a pair of lights. The bushings or hubs 332 and 334 are substantially the same as disclosed in other drawing Figures, and each may receive a connector nipple and a light fixture, etc. The grounding features disclosed with the other various nipples and hubs apply to each of the bushings or hubs 332 and 334. A screw 336 is also shown for securing the cap 330 to a cylinder.

In the drawing Figures, a light fixture has been illustrated and has been broadly discussed in the specification. It will be understood that, in some cases, an electrical box, for example a box having an electrical outlet, may be utilized instead of a light. Thus, the standard apparatus disclosed herein may be used to support a variety of electrical elements, as desired.

It will be noted that the caps shown herein are convexly domes. It will be understood that they may also be flat, if desired. Moreover, it will be noted that the plastic pipe is referred to herein as cylinders or as cylindrical. It will be understood that any desired configuration, e.g., square, hexagonal, octagonal, etc., may be used, and may still be incorporated into the broad terms "cylinder" or "cylindrical" as used herein. Typically, PVC plastic pipe is used because of its ready availability, its relatively inexpensive cost, and its suitability and adaptability, including the ease or cutting it as required. Obviously, other nonconductive plastic products may also be used, if desired.

It will also be noted that electrical conductor elements are shown disposed in conduits underground. Conduits may or may not be used for conductors, depending on local electrical codes, etc.

While the principles of the invention have been made clear in illustrative embodiments, there will be immediately obvious to those skilled in the art many modifications of structure, arrangement, proportions, the elements, materials, and components used in the practice of the invention, and otherwise, which are particularly adapted to specific environments and operative requirements without departing from those principles. The appended claims are intended to cover and embrace any and all such modifications, within the limits only of the true spirit and scope of the invention.

What I claim is:

1. Light standard apparatus for supporting electrical elements and for receiving electrical conductors and their associated connectors, comprising, in combination:
   non-conductive cylinder means, including an open bottom portion, for receiving electrical conductor elements, including at least an active pair of electrical conductors and a ground conductor and electrical conductor connectors for connecting the electrical conductors together;
   cap means removably secured to the cylinder means for closing the cylinder means and for receiving and supporting electrical elements; and
   grounding means secured to the cap means and to the electrical elements for grounding the electrical elements and including a ground element for connecting the ground conductor.

2. The apparatus of claim 1 in which the non-conductive cylinder means includes a cylinder made of non-conductive material and having a top portion, and the cap means is secured to the top portion.

3. The apparatus of claim 2 in which the cylinder of the non-conductive cylinder means further includes a first portion disposed above ground and a second portion disposed in the ground, and the open bottom portion is disposed in the ground for receiving electrical conductors disposed in the ground.

4. The apparatus of claim 3 in which the non-conductive cylinder means further includes stabilizer means for stabilizing the non-conductive cylinder means in the ground.

5. The apparatus of claim 4 in which the stabilizer means includes a plurality of plates secured to the second portion of the cylinder.

6. The apparatus of claim 3 in which the open bottom portion of the non-conductive cylinder means includes a slant cut for receiving into the cylinder electrical elements disposed at different depths in the ground.

7. The apparatus of claim 3 in which the second portion of the cylinder includes longitudinally extending slot means for receiving electrical elements disposed at different angular orientations in the ground.

8. The apparatus of claim 3 in which the second portion of the cylinder includes notch means, and the electrical conductor elements extend through the notch means into the cylinder.

9. The apparatus of claim 2 in which the nonconductive cylinder means further includes ring means secured to the cylinder adjacent to the open bottom portion and disposed on a surface and means for securing the ring means to the surface to secure the cylinder to the surface.

10. The apparatus of claim 1 in which the cap means includes a cap secured to the non-conductive cylinder means and bushing means secured to the cap for receiving and supporting and electrical elements.

11. The apparatus of claim 10 in which the cap means includes a plurality of apertures extending through the cap, and bushing means is disposed in each aperture.

12. The apparatus of claim 10 in which the cap means includes an aperture extending through the cap, and the bushing means is disposed in the aperture.

13. The apparatus of claim 11 in which the grounding means is secured to the bushing means.

14. The apparatus of claim 11 in which the grounding means includes a lug extending through the aperture and in electrical contact with the bushing means.

15. The apparatus of claim 11 in which the grounding means includes a grounding ring having a circular portion electrically connected to the bushing means and a tab extending outwardly from the circular portion for connecting to the ground conductor of the electrical conductors.

16. The apparatus of claim 1 in which the non-conductive cylinder means includes
a first cylinder having an open bottom portion,
a second cylinder disposed adjacent to the first cylinder and having an open bottom portion,
a spacer means extending between and secured to the first and second cylinders, and
the electrical elements extend into the first and second cylinders through the open bottom portions and through the spacer means to connect the electrical elements extending into the first and second cylinders.

17. The apparatus of claim 16 in which the cap means includes a first cap for the first cylinder and a second cap for the second cylinder, and the electrical elements are secured to the first cap.

18. The apparatus of claim 16 in which the spacer means includes a spacer extending between the first and second cylinders and a nipple disposed within the spacer and extending into and secured to the first and second cylinders to secure the cylinders and the spacers together.

* * * * *